W. HANNA.
SHOEMAKER'S TOOL.
APPLICATION FILED FEB. 28, 1910.
982,599.
Patented Jan. 24, 1911.
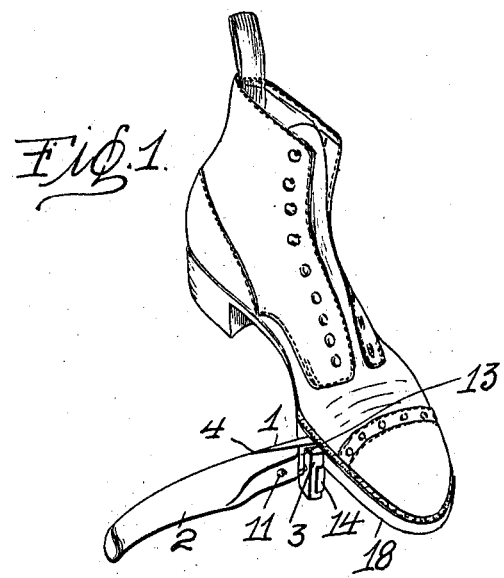
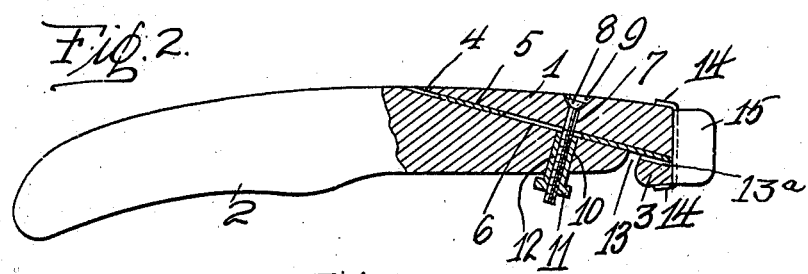
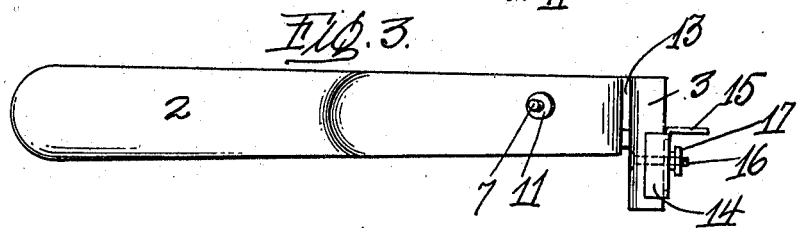
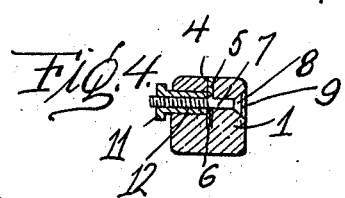
WITNESSES
Samuel Payne
K. H. Butler
INVENTOR
William Hanna,
BY N. C. Everts Co.
Attorneys.

UNITED STATES PATENT OFFICE.

WILLIAM HANNA, OF KILKEEL, IRELAND.

SHOEMAKER'S TOOL.

982,599.  Specification of Letters Patent.  Patented Jan. 24, 1911.

Application filed February 28, 1910. Serial No. 546,300.

*To all whom it may concern:*

Be it known that I, WILLIAM HANNA, a subject of the King of Great Britain, residing at Kilkeel, in the county of Down, Ireland, have invented certain new and useful Improvements in Shoemakers' Tools, of which the following is a specification, reference being had therein to the accompanying drawing.

This invention relates to a shoemaker's tool, and the objects of my invention are to provide a novel tool for scraping and shaving the edges of a shoe sole, and to provide a tool of the above type with a guard adapted to guide the tool when moving along a sole.

Other objects of the invention are to furnish a tool of the above type with an adjustable scraping and shaving blade that can be easily removed, sharpened and adjusted as it becomes worn, and to accomplish the above results by a tool that is simple in construction, durable, easy to manipulate, and highly efficient for the purposes for which it is intended.

These and such other objects as may hereinafter appear are attained by a mechanical construction that will be hereinafter specifically described and then claimed.

Reference will now be had to the drawing forming a part of this specification, wherein:—

Figure 1 is a perspective view of a shoe illustrating the manner of using the tool, Fig. 2 is an enlarged elevation of the tool, partly broken away and partly in section, Fig. 3 is a plan of the tool, and Fig. 4 is a cross sectional view of the same.

The tool comprises a shank 1 having a curved handle 2. The forward end of the shank 1 is provided with a head 3, which projects from one side of the shank, as best shown in Fig. 3 of the drawing.

The shank 1 has one side thereof provided with an angularly disposed slot or kerf 4 extending from the side of the shank 1 to the outer end of the head 3, said slot or kerf intersecting approximately one-third the width of said head. In the slot or kerf 4 is adjustably mounted a scraping or shaving blade 5 adapted to project from the forward end of the slot or kerf 4 sufficiently to provide a cutting edge at the outer side of the head 3. The scraper or blade 5 is provided with a longitudinal slot 6 and extending through said slot is a screw 7 having the head 8 thereof counter-sunk in a recess 9 provided therefor in the shank 1. The threaded end of the screw extends through an opening 10 formed in the shank 1 and adjustably mounted upon the threaded end of said screw is a nut 11 having a sleeve 12 extending into the opening 10. By rotating the nut 11, the inner end of the sleeve 12 can be carried into engagement with the scraper or blade to lock the same within the slot or kerf 4.

The head 3 is provided with a longitudinally extending slot 13ª which opens into a transverse slot 13 of a width corresponding to the slot or kerf 4, the said slot 13 is arranged within the shank 1 adjacent to the head 3 and provides an exit for shavings which pass through the slot 13ª when removed by the scraper or blade 5.

Slidably mounted upon the head 3 is a channel shaped guard 14, said guard having one end thereof provided with a right angular guide flange 15. The guard is adjustable relative to the head 3 and is held by a screw 16 and a nut 17, said screw being mounted in the head 3 to extend through a slot provided therefor in the guard, and the nut 17 is rotatably mounted upon the screw to hold the guard in its adjusted position.

The use of the tool is best shown in Fig. 1 of the drawing, where it will be observed that the scraper or blade is adapted to engage the side edge 18 of the sole and be guided thereon by the guide flange 15 engaging under the sole, thus preventing the tool from slipping and the edge of the scraper or blade injuring the upper of the shoe.

The shank 1 and the handle 2 can be made of one piece of strong and durable wood, or if desired of metal, while the guard 14 and the remaining parts of the tool are made of metal.

Having now described my invention what I claim as new, is:—

1. A shoemaker's tool, comprising a shank, said shank having an angularly disposed kerf formed therein, a blade adjustably mounted in the kerf of said shank and projecting from the end thereof, and an adjustable guard carried by the end of said shank and adapted to guide the movement of said shank.

2. A tool of the type described, comprising a shank, a head carried by said shank, said shank having an angularly disposed kerf formed therein extending from the surface of said shank to the end of said head, a blade adjustably mounted in said kerf, and an adjustable guard carried by the end of said head and adapted to guide the movement of said shank.

3. An instrument of the type described, comprising a shank, a handle carried by one end thereof, a head carried by the opposite end of said shank, said shank having an angularly disposed kerf formed therein extending from the surface of said shank to the end of said head, a slotted blade adjustably mounted in said kerf and projecting from said head, a guard adjustably mounted upon said head and having a guide flange adapted to guide the movement of said tool, and means carried by said shank for locking said blade in an adjustable position.

In testimony whereof I affix my signature in the presence of two witnesses.

WILLIAM HANNA.

Witnesses:
ALEXANDER GORDON,
JAMES IRVING.